United States Patent
Peric

(10) Patent No.: US 7,222,641 B2
(45) Date of Patent: May 29, 2007

(54) SNAP-IN FLAPPER VALVE ASSEMBLY

(75) Inventor: Yuri Peric, Oakville (CA)

(73) Assignee: Dana Canada Corporation, Oakville, Ontario (CA)

( * ) Notice: Subject to any disclaimer, the term of this patent is extended or adjusted under 35 U.S.C. 154(b) by 0 days.

(21) Appl. No.: 11/110,433

(22) Filed: Apr. 20, 2005

(65) Prior Publication Data

US 2006/0237185 A1    Oct. 26, 2006

(51) Int. Cl.
*F16K 15/16*    (2006.01)
(52) U.S. Cl. ............ 137/855; 165/280; 165/284; 165/916
(58) Field of Classification Search ........... 137/855, 137/856, 857, 858, 454.2, 454.4, 454.5, 454.6; 165/280, 283, 284, 297, 916, 167
See application file for complete search history.

(56) References Cited

U.S. PATENT DOCUMENTS

| | | | |
|---|---|---|---|
| 1,690,501 A | 11/1928 | Potts | |
| 1,860,163 A | 5/1932 | Wyzenbeek | |
| 2,698,063 A | 12/1954 | Brubaker | |
| 2,826,448 A | 3/1958 | Jones | |
| 3,289,693 A | 12/1966 | Scaramucci | |
| 3,568,712 A | 3/1971 | Rinehart | |
| 3,621,868 A | 11/1971 | Wise | |
| 3,949,716 A | 4/1976 | Liu | |
| 3,990,604 A | 11/1976 | Barnett et al. | |
| 3,998,243 A * | 12/1976 | Osterkorn et al. | 137/856 |
| 3,998,571 A | 12/1976 | Falke | |
| 4,179,051 A * | 12/1979 | Thomas | 222/494 |
| 4,193,442 A | 3/1980 | Vian | |
| 4,199,309 A | 4/1980 | Connor | |
| 4,337,737 A | 7/1982 | Pechner | |
| 4,360,055 A | 11/1982 | Frost | |
| 4,373,561 A | 2/1983 | Berger | |
| 4,425,067 A | 1/1984 | Krezak | |
| 4,471,804 A | 9/1984 | Bauer et al. | |
| 4,561,494 A | 12/1985 | Frost | |
| 4,669,532 A | 6/1987 | Tejima et al. | |
| 4,871,013 A | 10/1989 | Nilsson et al. | |

(Continued)

FOREIGN PATENT DOCUMENTS

CA    1005319    2/1977

(Continued)

OTHER PUBLICATIONS

U.S. Appl. No. 11/110,409 (Peric) entitled Tubular Flapper Valves, filed Apr. 20, 2005.

(Continued)

*Primary Examiner*—Eric Keasel
*Assistant Examiner*—Craig Schneider
(74) *Attorney, Agent, or Firm*—Ridout & Maybee LLP

(57) ABSTRACT

A flapper valve snaps into position in an inlet or outlet manifold of a heat exchanger to provide by-pass flow in cold flow or pressure spike conditions. The flapper valve includes a cradle having opposed spring fingers for retaining the valve in position. The cradle has a fluid port therein, and a spring flapper is attached to the cradle to cover the fluid port to control the by-pass flow therethrough.

9 Claims, 8 Drawing Sheets

U.S. PATENT DOCUMENTS

| | | |
|---|---|---|
| 5,078,209 A | 1/1992 | Kerkman et al. |
| 5,146,980 A | 9/1992 | Le Gauyer |
| 5,174,504 A | 12/1992 | Halvorsen |
| 5,236,043 A | 8/1993 | Armbruster |
| 5,266,016 A | 11/1993 | Kandpal |
| 5,273,385 A | 12/1993 | Rose |
| 5,351,664 A | 10/1994 | Rotter et al. |
| 5,380,176 A * | 1/1995 | Kikuchi et al. ............ 418/55.1 |
| 5,411,057 A | 5/1995 | Pouchot |
| 5,499,675 A | 3/1996 | Haasch et al. |
| 5,544,699 A | 8/1996 | Robers et al. |
| 5,558,346 A | 9/1996 | Hartery |
| 5,575,329 A | 11/1996 | So et al. |
| 5,588,485 A | 12/1996 | Gire |
| 5,595,214 A | 1/1997 | Shaffer et al. |
| 5,609,476 A | 3/1997 | Kim et al. |
| 5,765,632 A | 6/1998 | Gire |
| 5,921,273 A | 7/1999 | Ono et al. |
| 5,950,589 A | 9/1999 | Armbruster |
| 6,139,291 A | 10/2000 | Perevozchikov |
| 6,293,774 B1 | 9/2001 | Brabek |
| 6,298,910 B1 | 10/2001 | Komoda et al. |
| 6,358,024 B1 | 3/2002 | Djordjevic |
| 6,382,305 B1 | 5/2002 | Sano |
| 6,412,514 B1 | 7/2002 | Raftis |
| 6,427,768 B2 | 8/2002 | Komoda et al. |
| 6,460,613 B2 | 10/2002 | Nash et al. |
| 6,461,126 B1 | 10/2002 | Pierobon |
| 6,471,490 B2 | 10/2002 | Kimura et al. |
| 6,814,133 B2 | 11/2004 | Yamaguchi |
| 6,942,472 B2 | 9/2005 | Sieberg |
| 2003/0019620 A1 | 1/2003 | Pineo et al. |
| 2006/0102240 A1 | 5/2006 | Spiegl et al. |

FOREIGN PATENT DOCUMENTS

| | | |
|---|---|---|
| CA | 1102210 | 6/1981 |
| CA | 1122968 | 5/1982 |
| GB | 1 545 710 | 5/1979 |
| WO | WO 2005/048890 | 6/2005 |

OTHER PUBLICATIONS

U.S. Appl. No. 11/110,434 (Cheadle et al) entitled Self-Riveting Flapper Valves, filed Apr. 20, 2005.

U.S. Appl. No. 11/110,029 (Peric et al) entitled Slide-In Flapper Valves, filed Apr. 20, 2005.

U.S. Appl. No. 11/110,410 (Peric et al) entitled Flapper Valves with Spring Tabs, filed Apr. 20, 2005.

U.S. Appl. No. 11/110,288 (Peric et al) entitled Snap-In Baffle Insert for Fluid Devices, filed Apr. 20, 2005.

* cited by examiner

SNAP-IN FLAPPER VALVE ASSEMBLY

FIELD OF THE INVENTION

This invention relates to heat exchangers, and in particular, to flapper-type bypass valves for heat exchangers.

BACKGROUND OF THE INVENTION

Automotive fluids, such as engine oil or transmission fluids, absorb heat in use. To prevent fluid deterioration, this heat often needs to be removed. Heat exchangers are commonly used for this purpose. Moreover, heat exchangers are known to perform this function adequately in moderate ambient conditions. However, in cold ambient conditions, engine oils and transmission fluids can be highly viscous. In such conditions, the flow resistance through the heat exchangers is very high. As a result, in such conditions, the flow in an oil circuit containing a heat exchanger can be impeded to such an extent that starvation of some downstream components, like transmissions, may even occur.

In order to avoid these adverse effects, it is known to provide a mechanism for bypassing the heat exchanger. One way that this has been done in the past is to provide a bypass conduit. The bypass conduit is connected in parallel with the heat exchanger and has a relatively low resistance to the flow of high viscosity fluids as compared to the heat exchanger. Structures of this type are known to avoid starvation of downstream components, but can suffer in that, in normal operating conditions, the flow is split between the heat exchanger and the bypass circuit. This requires that the heat exchangers be made proportionately larger and heavier to achieve the same overall heat exchange performance for the cooling system. This added size and weight, and the added costs associated therewith, are undesirable to automotive manufacturers.

To ameliorate the split-flow problem, it is known in the prior art to provide bypass valves. Sometimes, these bypass valves are pressure-activated, and are built into the heat exchanger. A heat exchanger exemplary of the foregoing is shown in U.S. Pat. No. 5,499,675 (Haasch et al.), issued Mar. 19, 1996. This structure includes a flapper valve of spring steel biased in a closed position, to prevent bypass flow, and which is adapted to: be urged, open when the fluid pressure inside the heat exchanger exceeds a certain limit, as indicative, of cold-start conditions. Heat exchangers of this general type can avoid starvation of downstream lubricated components, and can be adapted such that bypass flow is substantially nil in normal operating conditions, thereby to permit compact heat exchanger construction. However, in Haasch et al, the flapper valve is rather delicate and exposed while the heat exchanger is being mounted to the engine block, using an extension of the oil return pipe. The flapper valve is prone to suffering damage or being dislodged during installation. Also, heat exchangers of this type cannot be modified easily to accommodate different mounting or performance requirements in modern automotive applications.

It is also known to provide heat exchangers including a domed filter plate and a snap-in valve clip. Structures of this type are described in U.S. Pat. No. 4,561,494 (Frost), issued Dec. 31, 1985; U.S. Pat. No. 5,588,485 (Gire), issued Dec. 31, 1996; and U.S. Pat. No. 5,765,632 (Gire), issued Jun. 16, 1998. While the flapper valves in these structures are less prone to damage or dislodgement during heat exchanger installation, these heat exchangers are relatively inflexible in terms of the location of the bypass apertures or the size or shape of the oil filter that can be used with them.

SUMMARY OF THE INVENTION

In the present invention, a flapper valve assembly is provided that includes a cradle having spring fingers which allow it to snap into place anywhere desired in a heat exchanger inlet manifold or outlet manifold and which can be orientated such that its flapper opens either inwardly or outwardly to give maximum flexibility in use, thereby to accommodate different performance requirements in modern automotive applications.

According to one aspect of the invention, there is provided a flapper valve assembly for use with a fluid device having a flow passage defined by a peripheral wall formed with opposed recesses therein. The flapper valve assembly includes a cradle dimensioned to be located slidably in the flow passage to blow flow through the flow passage, the cradle having a fluid port therein to allow flow therethrough and thus through the flow passage. The cradle has opposed, resilient, outwardly disposed fingers adapted to engage the flow passage opposed recesses and retain the cradle in position in the flow passage. A flapper has a mounting part secured to the cradle and a hinged tongue part that includes a blocking portion. The tongue part is movable from a first position where the blocking portion at least partially closes the fluid port, to a second position where the blocking portion opens the fluid port. Also, bias means is provided for urging the tongue part into the first position.

According to another aspect of the invention, a heat exchanger is provided comprising a heat exchange element including an inlet manifold, an outlet manifold, and flow passages therebetween for the passage of one heat exchange fluid through the heat exchange element. The inlet and outlet manifolds have peripheral walls defining opposed recesses formed therein. A cradle is adapted to be located slidably in one of the inlet and outlet manifolds. The cradle is dimensioned to block flow through the one manifold. The cradle defines a fluid port for the passage of fluid through the cradle. The cradle has opposed, resilient, outwardly disposed fingers engaging the opposed recesses in the one manifold peripheral wall to retain the cradle in position in the one manifold. Also, a flapper has a mounting part secured to the cradle and a hinged resilient tongue part extending from the mounting part and disposed to at least partially restrict flow through the cradle fluid port. The tongue part is movable through flexure of the tongue part, to an open configuration, allowing increased flow through the cradle fluid port.

Advantages, features and characteristics of the present invention, as well as methods of operation and functions of the related elements of the structure, and the combination of parts and economies of manufacture, will become apparent upon consideration of the following detailed description with reference to the accompanying drawings, in which:

DESCRIPTION OF THE PREFERRED EMBODIMENTS

Figure 1:
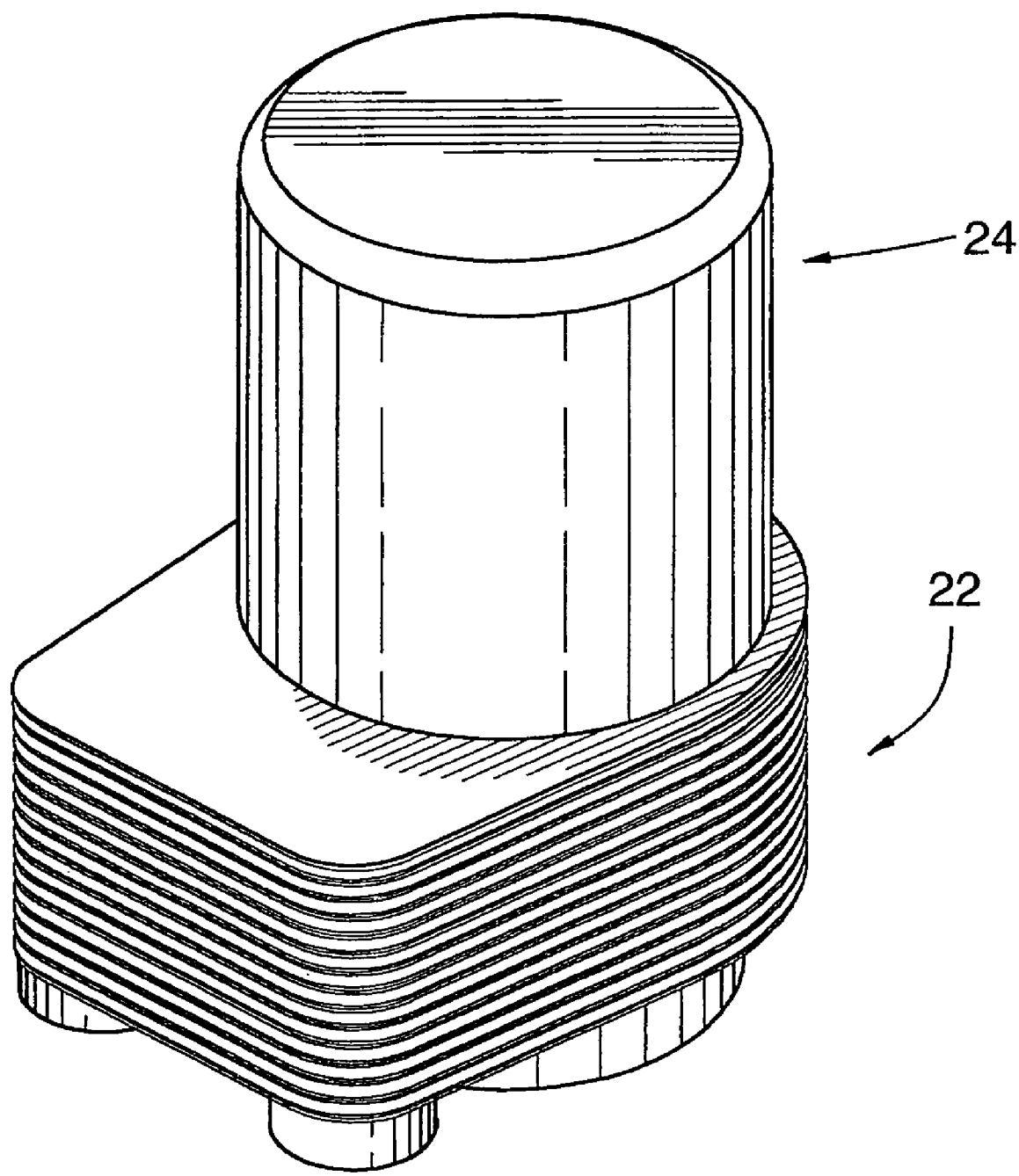
FIG. 1 is a perspective view of an assembly including a heat exchanger and a spin-on oil filter, the heat exchanger including a flapper valve assembly according to a preferred embodiment of the present invention.

FIG. 1 shows a heat exchanger or heat exchange element 22 having a spin-on type oil filter 24 or similar fluid device mounted thereon.

Figure 2:
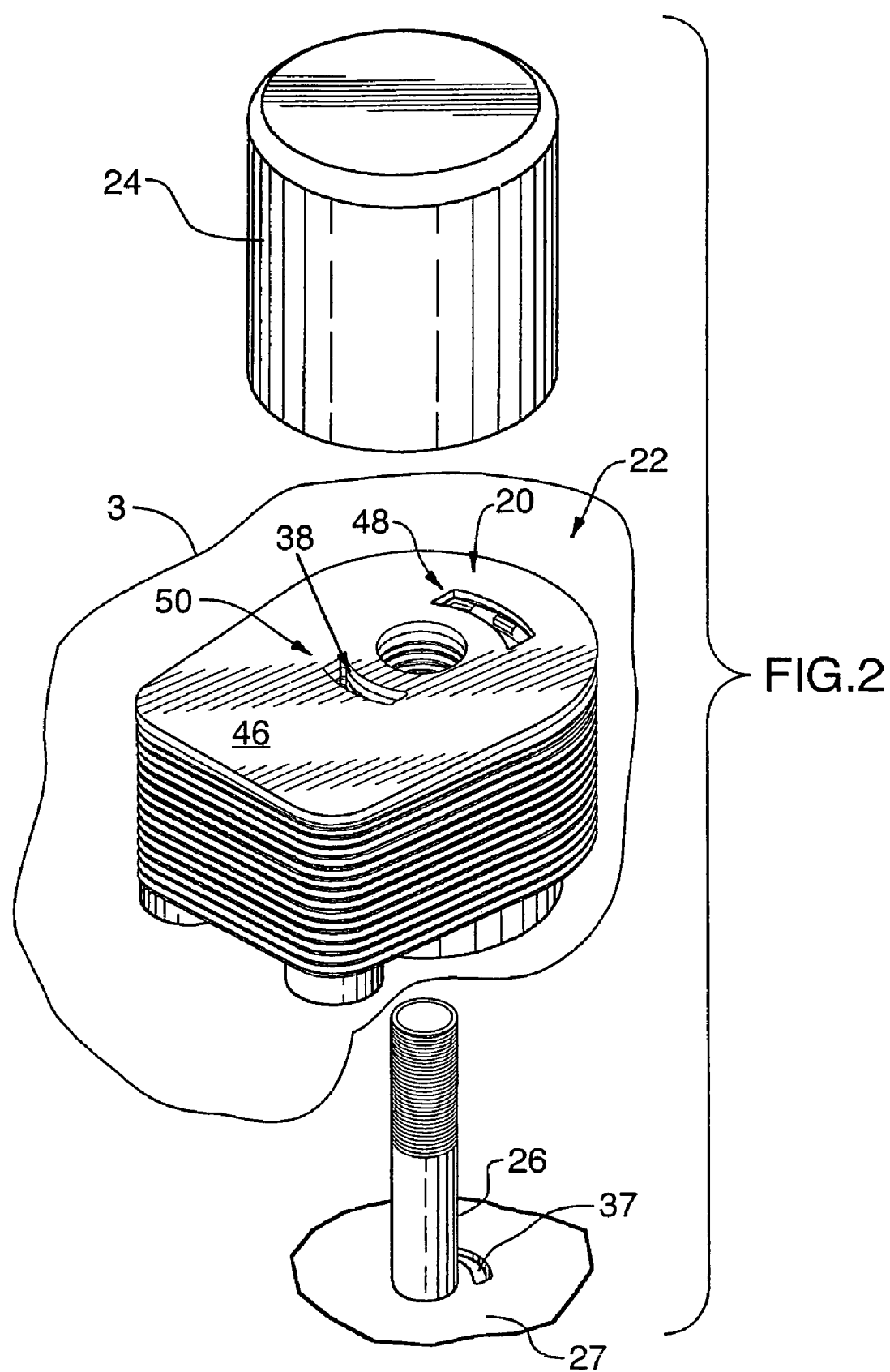
FIG. 2 is an exploded view of the structure of FIG. 1 about to be mounted on an engine block.

Referring to FIG. 2, heat exchange element 22 preferably is a donut type oil cooler and it has a flapper valve assembly generally indicated by reference numeral 20, that is constructed according to a preferred embodiment of the present invention.

The heat exchange element 22 is for use with a coolant circuit and a lubrication or other fluid circuit and, by way of example, is shown in FIG. 2, to be mounted on a threaded pipe 26 attached to an engine block 27. This permits the subsequent threaded engagement of the oil filter 24 onto pipe 26, as indicated in FIG. 1, and to also hold heat exchanger 22 in place.

Figure 7:
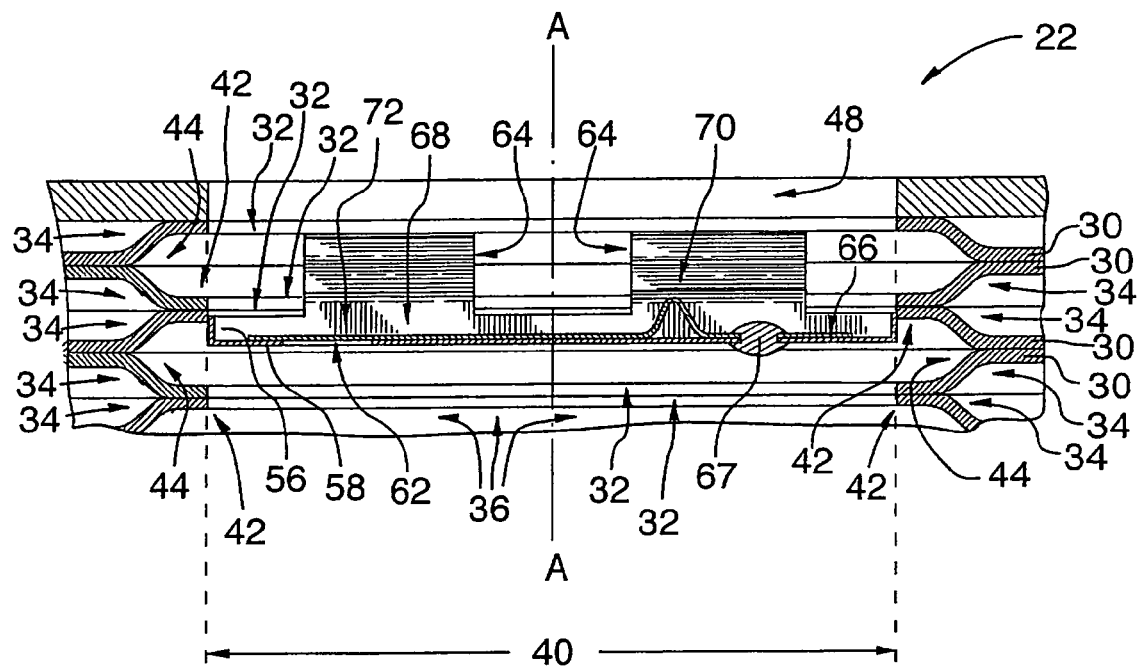
FIG. 7 is a cross-sectional view taken along lines 7—7 of FIG. 6.
Figure 8:
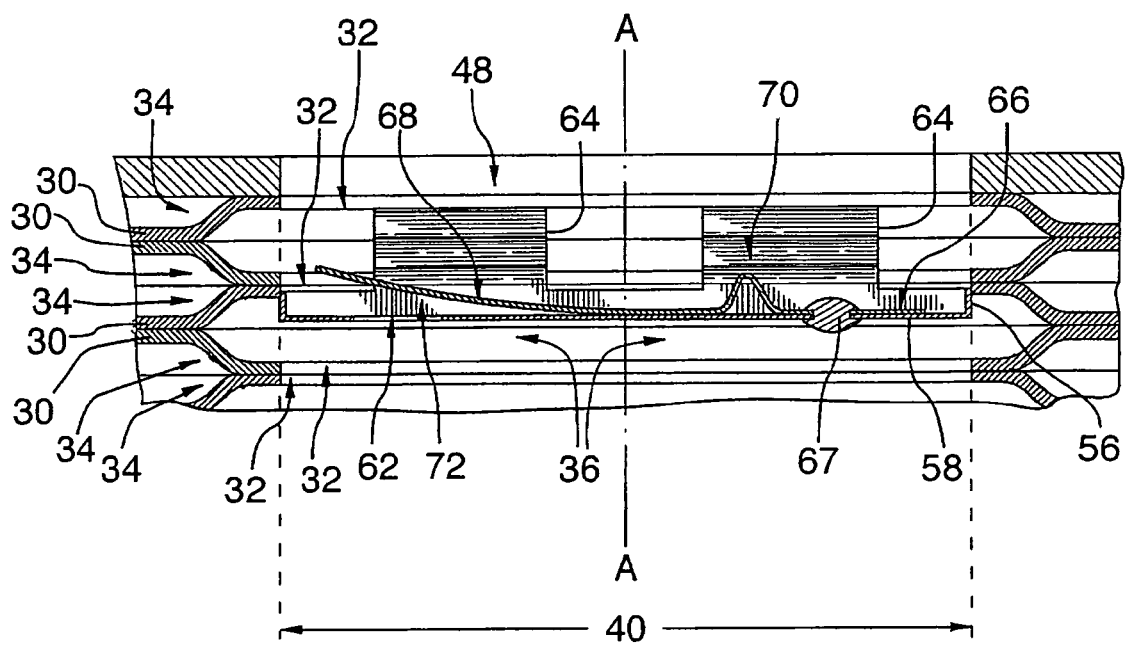
FIG. 8 is a view, similar to FIG. 7, with the flapper in its open configuration.
Figure 9:
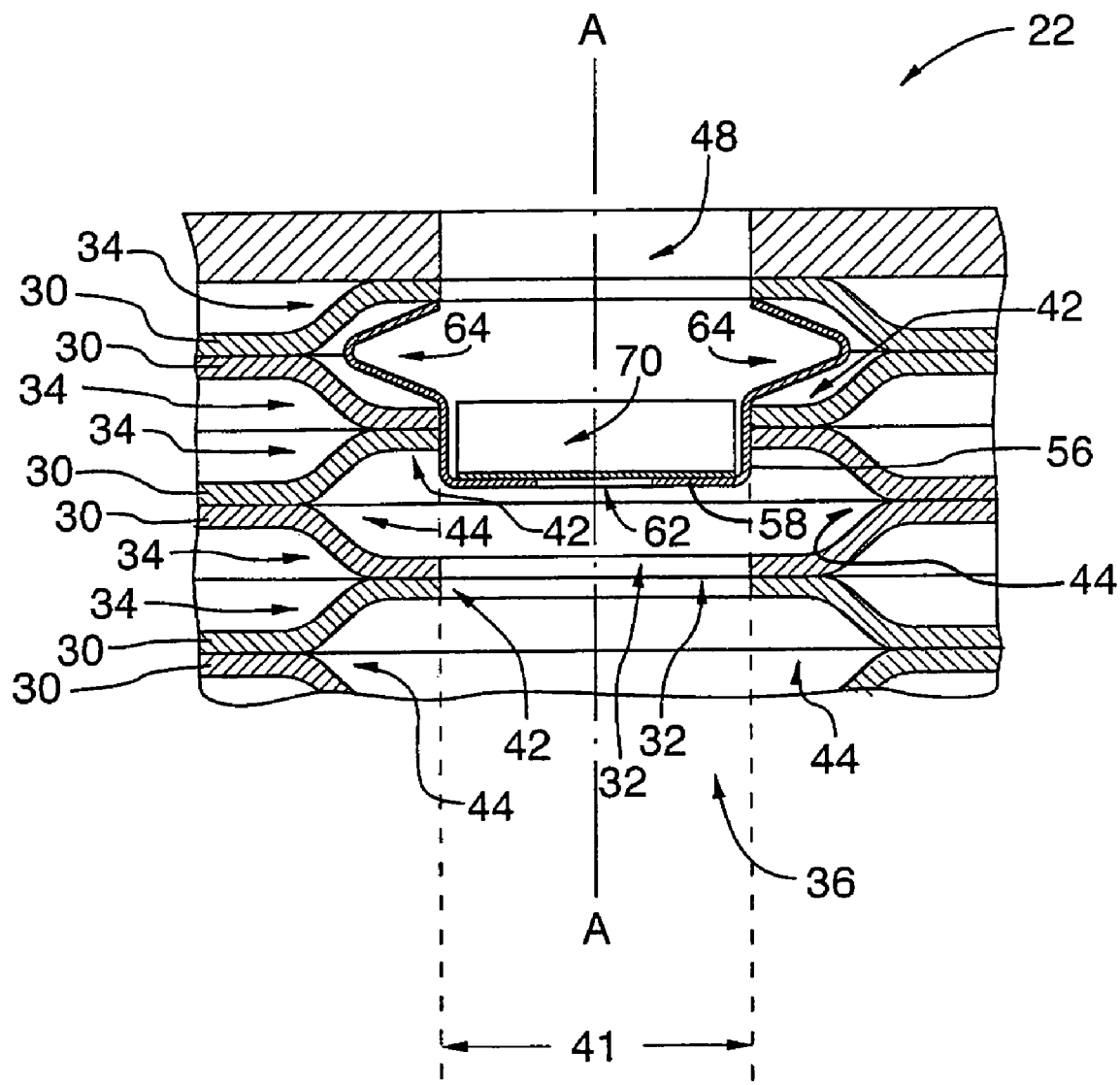
FIG. 9 is a cross-sectional view taken along lines 9—9 of FIG. 6.

As best seen in FIGS. 7 to 9, the heat exchange element 22 is of the stacked-plate type, comprising a plurality of plates 30 of aluminum brazed to one another. The plates are arranged back-to-back into plate pairs. The plates 30 have apertures 32 formed therein. The apertures 32 are ringed or encircled by raised bosses 34, and when the plates are stacked against one another into the plate pairs, the bosses are opposite facing with the apertures 32 and bosses 34 aligned. The apertures 32 thus form spaced-apart flow passages or manifolds 36.

Figure 3:
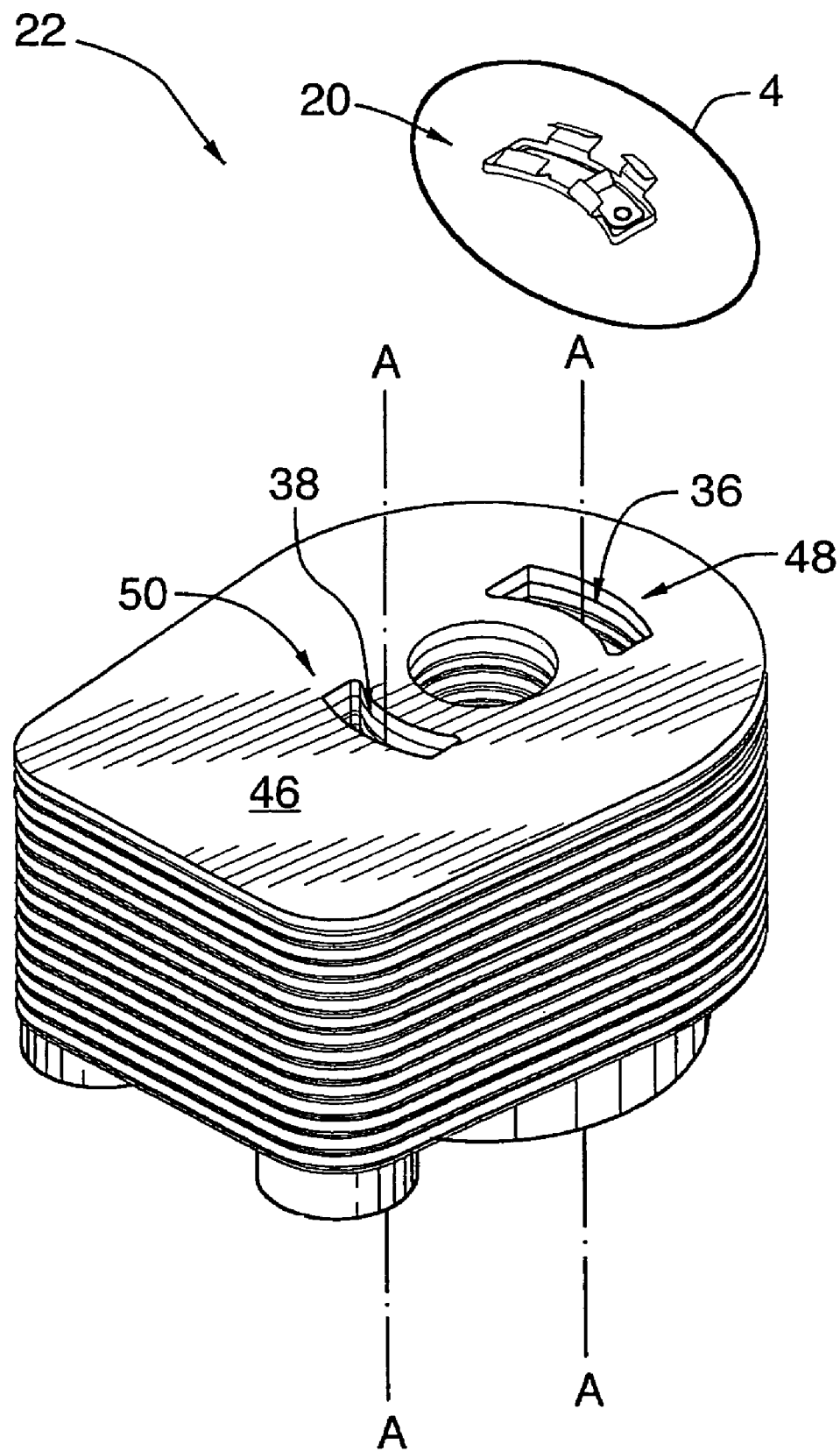
FIG. 3 is an exploded view of the encircled area 3 in FIG. 2.

As seen in FIG. 3, there is a second manifold 38 which is similar to manifold 36. One of these manifolds can be an inlet manifold, for example, manifold 36. The other of them can be an outlet manifold 38, but this could be reversed. Where manifold 36 is the inlet manifold, oil is received into the manifold 36 through an aperture 37 formed in engine block 27 (see FIG. 2). This oil passes through heat exchange element 22 to outlet manifold 38, and then passes upwardly into oil filter 24, and finally down through pipe 26 to be returned to engine block 27. However, the flow direction could be reversed, so it comes up through pipe 26 to filter 24, and then passes through manifold 38 to manifold 36 and then back through aperture 37 to be returned to the engine.

In each manifold or flow passage 36, 38, the aligned apertures 32 define part of the flow passage, and each flow passage has a central, longitudinal axis A—A (see FIGS. 3 and 7 to 10). The peripheral edges of apertures 32 in abutting bosses 34 define a plurality of axially spaced-apart annular ridges 42 projecting into and forming part of the flow passages 36, 38. The annular ridges 42, in turn, define therebetween a plurality of axially or longitudinally spaced-apart annular recesses or channels 44, which also form part of the flow passages 36, 38. This structure is best indicated in FIGS. 7 to 9, wherein the effective horizontal length and width of the flow passages is represented by arrows 40 and 41 respectively. The annular ridges 42 and channels 44 form a peripheral wall for the flow passages 36, 38, and include opposed recesses therein, as described further below.

The inlet manifold 36 and the outlet manifold 38 are coupled to one another in heat exchanging relation such that, in use, upon a flow of heated oil being forced into the inlet manifold 36, a flow of cooled oil is produced at the outlet manifold 38, or, as mentioned above, this flow direction could be reversed.

As best shown in FIG. 3, the donut cooler 22 also comprises a substantially flat or planar filter-receiving plate or portion 46 having ports 48,50 therethrough communicating with the inlet manifold 36 and the outlet manifold 38, respectively. The ports 48,50 permit the inlet manifold 36 and the outlet manifold 38, respectively, to be coupled to the oil filter 24 in use, for the delivery of oil to and from the filter, when the oil filter 24 is threadably attached to the oil return pipe 26 as aforedescribed.

It should be understood that the heat exchange element 22 is of generally conventional construction, and therefore, only those parts necessary for an understanding of the present invention are shown in the figures and described herein. For the purposes of the present specification, the exact form of the heat exchanger element 22 and the spin-on oil filter 24 is not considered to be part of the present invention.

Figure 4:
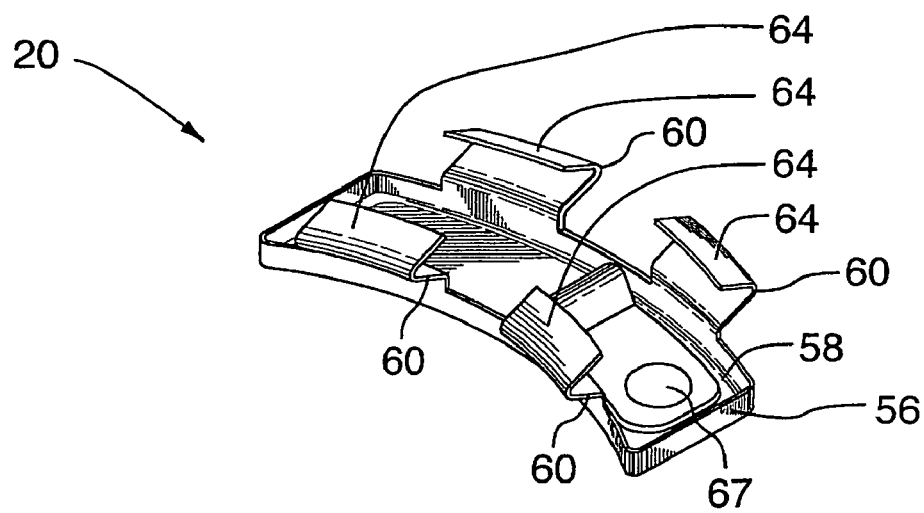
FIG. 4 is an enlarged perspective view of the flapper valve assembly as shown in the encircled area 4 in FIG. 3.
Figure 5:
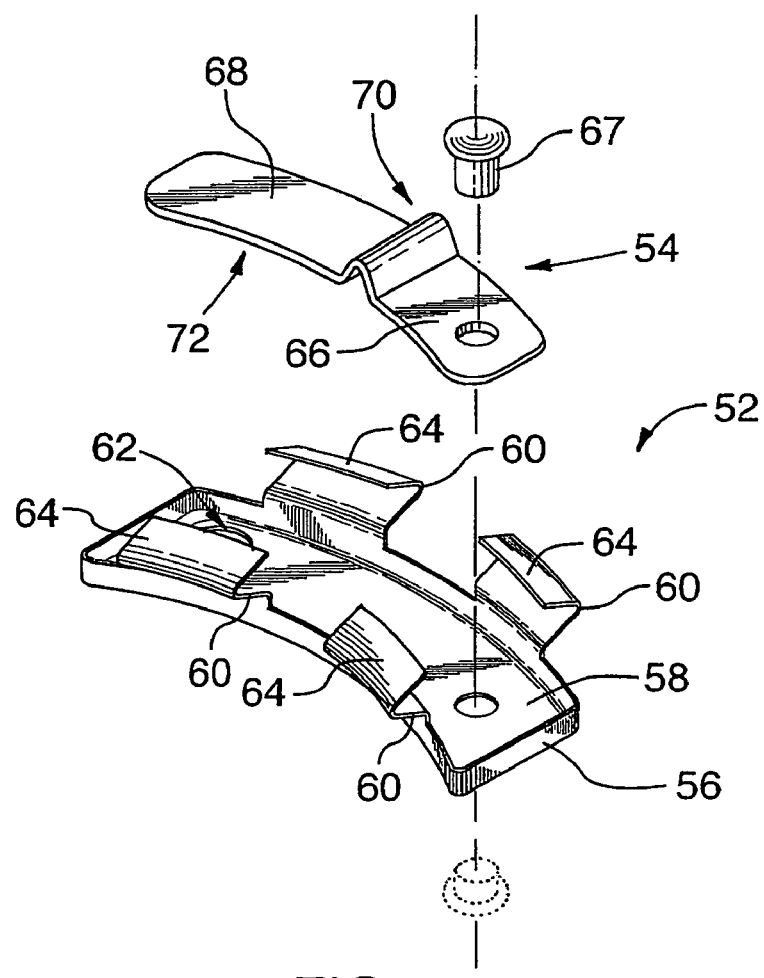
FIG. 5 is an exploded perspective view of the flapper valve assembly of FIG. 4.
Figure 6:
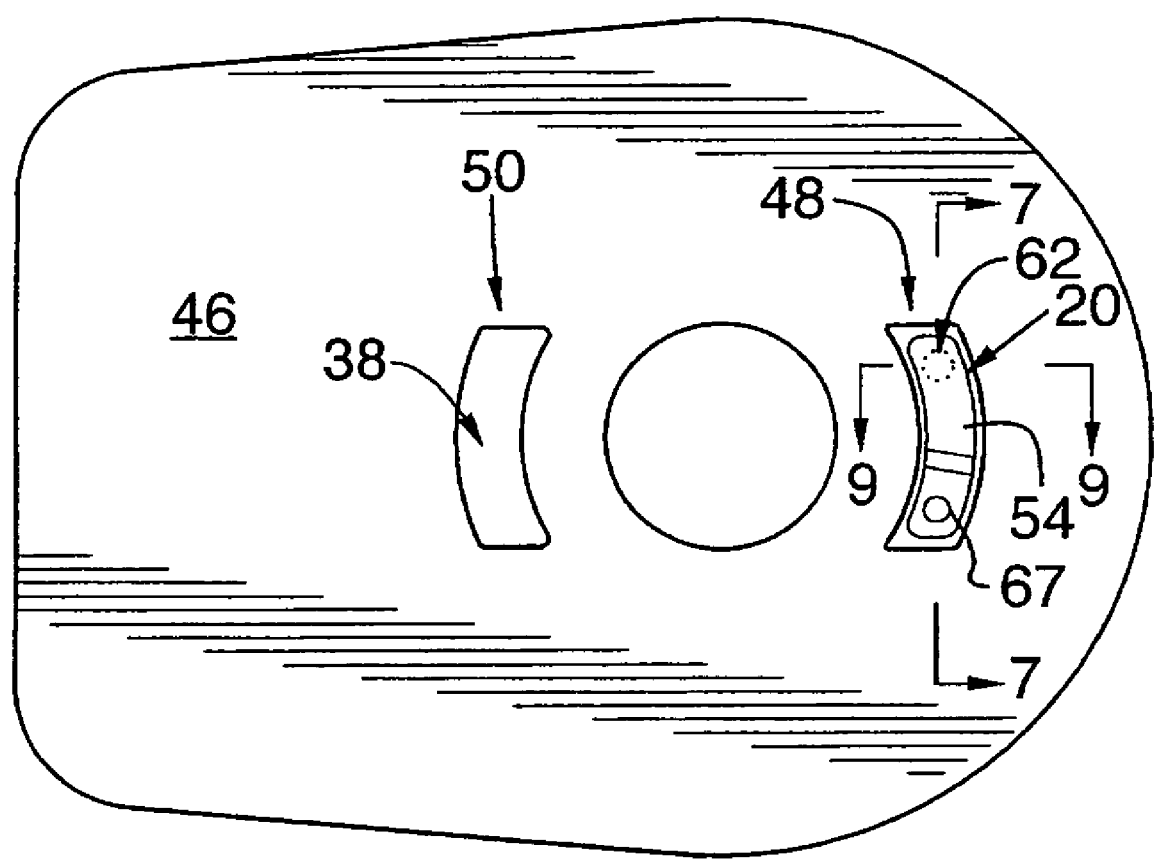
FIG. 6 is a top plan view of the heat exchanger shown in FIGS. 1 to 3.

Referring next FIGS. 4 and 5, the flapper valve assembly 20 includes a cradle 52 and a flapper 54. The cradle 52 comprises a base portion 58, and a peripheral wall portion 56 and opposed, spaced-apart, resilient, outwardly disposed fingers or grip means 60. Cradle 52 has an operative position in the inlet manifold 36 adjacent to port 48, as shown in FIGS. 2 and 7 to 9.

The peripheral wall portion 56 of cradle 52 is dimensioned for sliding but snug engagement with the peripheral wall of flow passage 36, and in particular, with a respective annular ridge 42 when the cradle 52 is operatively positioned, as is best seen in FIGS. 7 to 9. The cradle 52 is thus dimensioned to be located in flow passage 36 to block the flow therethrough. The base portion 58 defines a valve orifice or fluid port 62 therein to allow flow through the cradle and thus through the flow passage 56.

The resilient fingers 60 releasably engage an aforementioned channel 44, when the cradle 52 is operatively positioned, to lock the cradle 52 in position in said fluid device 22. Actually, fingers 60 engage opposed portions of channel 44, but fingers 60 could also engage opposed recesses in flow passage 36, if it is desired not to make an annular channel 44. In the preferred embodiment illustrated, there are four spaced-apart fingers 60 connected to the peripheral wall portion 56, although there could be more or fewer fingers, as desired. Each finger 60 has a V-shaped tab portion 64, each tab portion having an apex that extends outwardly to engage a respective recess or portion of the annular channel 44 in the peripheral wall of flow passage 36.

Figure 10:
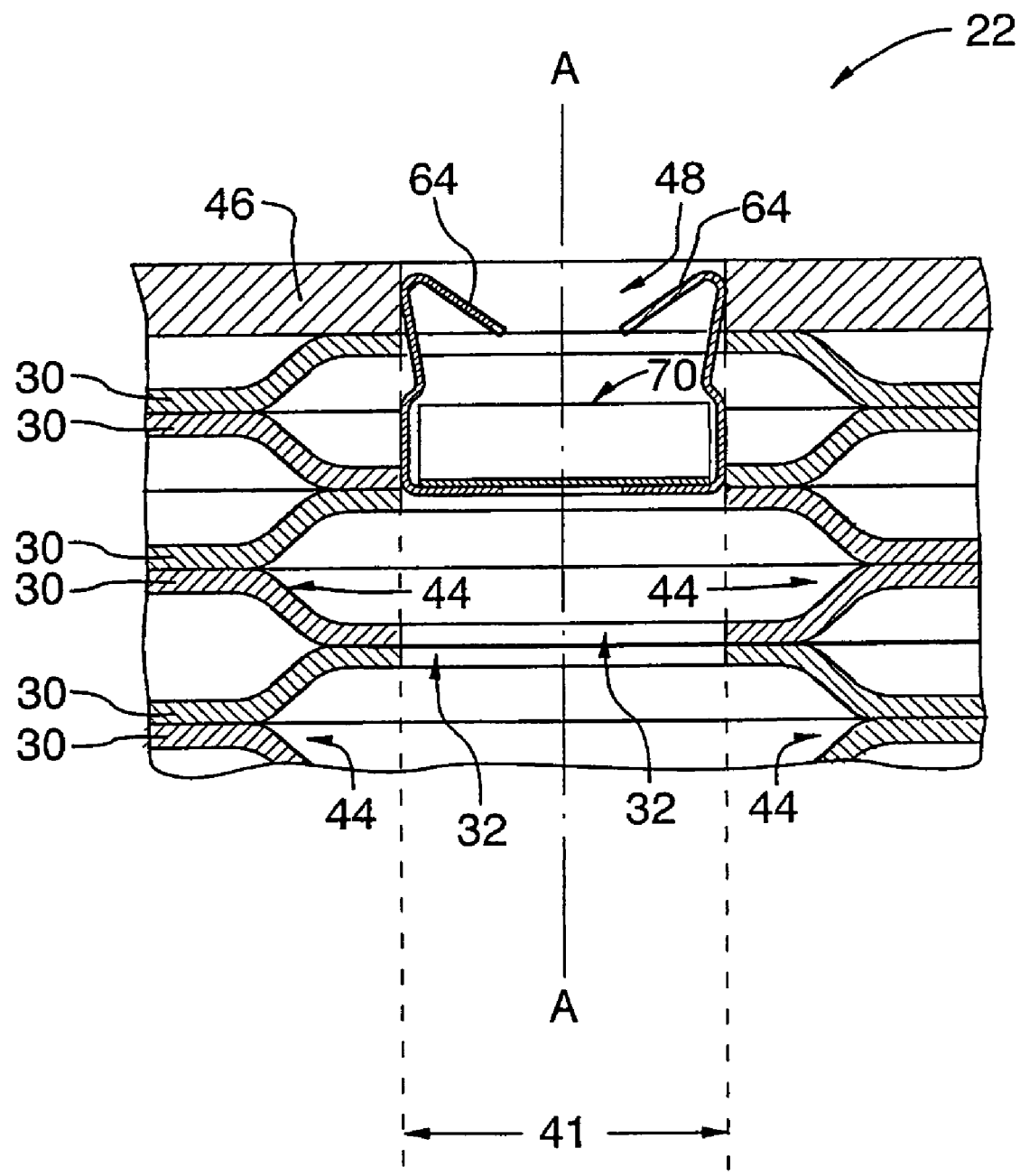
FIG. 10 is a view, similar to FIG. 9, showing the flapper valve assembly being inserted into a manifold of the heat exchanger.

The fingers 60 are resiliently deformable from an outwardly disposed arrangement as shown in FIGS. 7 to 9, to an inwardly deformed arrangement, as shown in FIG. 10, where the cradle 52 can be slid through port 48 and apertures 32, to be located at any desired location in flow passage 36. The fingers are in their outwardly disposed arrangement when the cradle is retained in its operative position. Thus, the cradle 52 may be conveniently installed into the heat exchange element 22 after it has been constructed simply by positioning cradle 52 into port 48 and forcing the cradle into the inlet manifold 36 using a suitable tool (not shown), during which process, the tabs 64 retract to the inwardly disposed arrangement, to permit entry into the manifold 36. Fingers 64 then spring outwardly to the outwardly disposed arrangement to engage channel 44 when the cradle 52 reaches a desired or preselected operative position, but the cradle can continue to be pushed lower into manifold 36 to another position, or it can be pushed all the way through flow passage 36 to start all over, if cradle 52 was positioned incorrectly in the first instance.

Alternatively, the tabs 64 could be made a bit longer and holes or distal flanges formed in them, so the fingers could be gripped by a suitable tool (not shown). This would allow the fingers to be deformed inwardly by the tool, so the flapper valve assembly 20 could be relocated or removed, or installed initially, or reinstalled as desired.

In the preferred embodiment illustrated, the peripheral wall 56, base portion 58 and fingers 64 are formed integrally, out of spring steel, in a stamping process.

Turning now to the flapper 54, same will be understood to be stamped from spring steel and to have a mounting part 66 and a resilient hinged tongue part 68, as best seen in FIG. 5. The mounting part 66 is secured to the cradle 52 by a rivet 67.

The tongue part 68 extends away from the mounting part 66 and includes a corrugation 70 and a plug or blocking portion 72. Corrugation 70 is optional. The corrugation 70 helps to bias or urge the flapper 54 to assume a fluid tight closure or closed configuration, wherein the blocking portion 72 of the tongue part 68 abuts and bears against the cradle 52 to cover fluid port 62, as seen best in FIG. 7. The blocking portion 72 is dimensioned to restrict, and more specifically, substantially arrest flow through the fluid port 62 when the flapper 54 is so disposed. However, blocking portion 72 can be shaped or dimensioned to restrict or block only a portion of fluid port 62 where it is desired to have some permanent by-pass flow through flapper valve assembly 20.

If desired, cradle 52 and flapper 54 could be formed integrally, out of spring steel, in a stamping process. In this case, the flapper could be formed by making a U-shaped cut in the cradle base portion 58. There would be no discrete fluid port 62. The fluid port would be created by the flapper flexing transversely.

As seen best in FIG. 8, the flapper tongue part 68 flexes transversely or upwardly to uncover fluid port 62 and open flapper valve assembly 20. Usually this occurs when there is a cold flow pressure increase on the underside of flapper valve assembly 20, but it could also occur if there is a pressure spike in the oil circuit unrelated to oil temperature.

In normal operating conditions, wherein relatively warm, substantially free-flowing oil is delivered to the inlet manifold 36, the spring constant of flapper 54 keeps the blocking portion 72 of the tongue part 68 in a first position or closed configuration against base portion 58 to restrict, and more specifically, substantially arrest or stop flow through fluid port 62. Thus, most of the flow arriving at the inlet manifold 36 passes in heat exchanging relation through the heat exchange element 22 to the outlet manifold 38, transferring heat in the process, prior to passing through port 50 to the oil filter 24, for filtering, and subsequent return to the oil circuit in a conventional manner.

In contrast, in conditions such as are present where there are relatively cold ambient conditions, such as at engine start-up in cold weather, the oil is relatively cold and viscous. The flow resistance through the heat exchange element 22 is relatively high in these circumstances, with the result that the viscous oil forces the blocking portion 72 of the tongue part 68 to a second position or open configuration spaced above the cradle base portion 58, as indicated in FIG. 8, such that oil flow passes from the inlet manifold 36 through port 48 to filter 24. That is, bypass flow occurs. In other words, the heat exchange element is bypassed. Periodic, momentary pressure spikes or burst flows in the engine oil circuit also cause the flapper tongue part 68 to move to the second position to cause the fluid in the manifold 36 to bypass the heat exchange element 22 as well.

Where the flow path is reversed, so that oil normally comes through pipe 26 to filter 24, and then passes through manifold 38 to manifold 36 and then back through aperture 37 to be returned to the engine, flapper valve assembly 20 would be turned upside down, or flapper 54 could be mounted on the underside of cradle base position 58, so that flapper tongue part 68 opens downwardly into manifold 36, again bypassing the heat exchange element under certain conditions.

The mechanical properties of the flapper are selected to suit the operating parameters of the heat exchange element and lubrication circuit with which it is used; and in particular, the flapper has a spring constant such that it will open under a predetermined pressure value or conditions, such as at a pressure below which the heat exchanger could be damaged by excessive internal pressures.

The foregoing structure is of particular advantage, in that it obtains relatively high cooling performance in normal operating conditions, when cooling is needed, as substantially all oil passes through the heat exchange element to transfer its heat to the engine coolant in such conditions.

At the same time, the structure avoids starvation of mechanical components in high pressure conditions, such as cold weather startup, and also avoids metal fatigue that can result from pressure spikes in the thin-wall plates forming the heat exchanger, since in such conditions bypass flow occurs.

Having described preferred embodiments of the present invention, it will be appreciated that various modifications may be made to the structures described above without departing from the spirit or scope of the invention.

For example, whereas the flapper valve assembly of the present invention is shown in use with a heat exchanger, it should be understood that the invention is not so limited, and may be deployed in association with any fluid device defining a flow passage having a central, longitudinal axis and further defining a peripheral wall with opposed recesses that the flapper valve assembly can engage to be retained in position.

Flapper valve assembly 20 is shown to have four resilient fingers 60, but there could be just two opposed fingers if desired.

Further, whereas the heat exchange element shown has a plurality of axially-spaced annular channels or opposed recesses, this need not be the case. The flapper valve assembly can be used with a heat exchanger having only one such channel or one pair or set of opposed recesses.

It should also be understood that whereas the disclosure illustrates and describes a heat exchanger of specific construction, modifications therein are also contemplated to fall within the scope of the invention. For example, heat exchangers that are not of the donut type may be utilized. As well, the heat exchangers need not be formed of stacked plates, nor is it required that all or any of the various components be brazed to one another. The plates forming the heat exchanger could, for example, be secured to one another with a suitable adhesive, such as epoxy. Tubes could also be used instead of plate pairs to define some or all of the flow passages.

As a further modification, whereas the flapper of the preferred embodiment consists of a strip of simple spring steel, a resilient bimetallic strip could be readily substituted therefor, to vary the amount of bias provided in accordance with variations in temperature of the fluid to which it is exposed. For example, a bimetallic flapper could open in cold conditions to give full or partial bypass-flow even if the pressure was not excessive, and close in warm conditions to give no bypass but still give pressure relief as needed, because the bimetallic flapper valve would still have a flexible tongue part or blocking portion and provide pressure spike protection even in warm flow conditions.

As well, whereas the flapper tongue part of the preferred embodiment is provided with a corrugation 70, to provide secure spring-tension to urge the blocking portion into fluid tight engagement against the fluid port, this need not be the case. The corrugation could be eliminated, or configured to have the tongue part only loosely cover the flapper fluid port to provide some leakage or permanent by-pass flow.

Further, whereas the flapper blocking portion illustrated in the preferred embodiment is substantially planar, it will be evident that this need not be the case, and any form of protuberance could be formed to fit, in whole or in part, in the flapper assembly fluid port.

As well, the construction of the flapper blocking portion need not be limited to the spring material of which the remainder of the tongue part is constructed. Coatings or sealant material could also be applied to assist in sealing, especially if the flapper is made of a weaker spring material. The flapper could be also made of other resilient material, such as plastic, if desired.

Further, whereas in the preferred embodiments illustrated, the flapper is adapted to substantially arrest flow when the flapper blocking portion is disposed at its closed position, this need not be the case. The blocking portion could, for example, be sized to only partially cover the fluid port, thereby to permit a measure of bypass flow at all times.

Finally, the flapper valve assembly need not be located in the inlet manifold or flow passage. It could be located in the outlet manifold with suitable modifications to the outlet manifold, such as the addition of a further outlet opening in the bottom of the heat exchanger. Also, the flapper valve assembly can be located facing up, as described, or turned upside down, to suit the direction of flow through the heat exchanger.

From the foregoing, it will be evident to persons of ordinary skill in the art that the scope of the present invention is limited only by the accompanying claims, purposively construed.

The invention claimed is:

1. A flapper valve assembly for use with a fluid device having a flow passage defined by a peripheral wall formed with opposed recesses therein, the flapper valve assembly comprising:

a cradle, dimensioned to be located slidably in the flow passage to block flow through the flow passage, the cradle having a fluid port therein to allow flow therethrough and thus through the flow passage;

the cradle having opposed, resilient, outwardly disposed fingers adapted to engage the flow passage opposed recesses and retain the cradle in position in the flow passage;

a flapper having a mounting part secured to the cradle, and a hinged tongue part that includes a blocking portion, the tongue part being moveable from a first position where the blocking portion at least partially closes the fluid port, to a second position where the blocking portion opens the fluid port; and bias means for urging the tongue part into the first position wherein there are four spaced-apart fingers, each finger having a V-shaped tab portion, the apex of the tab portion extending outwardly to engage a respective one of said opposed recesses in the peripheral wall of the flow passage.

2. A flapper valve assembly according to claim 1 wherein the cradle includes a base portion defining the fluid port, and a peripheral wall portion dimensioned to engage the peripheral wall of the flow passage in snug-fitting relation when the cradle is operatively positioned in the flow passage.

3. A flapper valve assembly according to claim 1 wherein the fingers are resiliently deformable from an outwardly disposed arrangement into an inwardly deformed arrangement, the fingers being in their outwardly disposed arrangement when the flapper valve assembly is retained at its operative position, and the cradle being slidably located in said flow distribution passage when the fingers are in their inwardly deformed arrangement.

4. A flapper valve assembly according to claim 1 wherein the flapper blocking portion is configured to substantially stop flow through the fluid port when the flapper tongue part is in the first position.

5. A flapper valve assembly according to claim 1 wherein the flapper blocking portion is configured to partially stop flow through the fluid port when the flapper tongue part is in the first position.

6. A flapper valve assembly according to claim 1 wherein the bias means is the flapper tongue part formed of resilient material.

7. A flapper valve assembly according to claim 6 wherein the flapper is formed of spring steel.

8. A flapper valve assembly according to claim 6 wherein the flapper is formed of a bimetallic strip, so that the tongue part moves between the first and second positions in response to temperature variations.

9. A flapper valve assembly according to claim 6 wherein the flapper hinged tongue part includes a transversely disposed corrugation.

* * * * *